(12) United States Patent
Harik

(10) Patent No.: US 9,336,498 B2
(45) Date of Patent: May 10, 2016

(54) METHOD AND APPARATUS FOR IMPROVING RESILIENCE IN CUSTOMIZED PROGRAM LEARNING NETWORK COMPUTATIONAL ENVIRONMENTS

(71) Applicants: Georges Harik, Palo Alto, CA (US); PageBites, Inc., Palo Alto, CA (US)

(72) Inventor: Georges Harik, Palo Alto, CA (US)

(73) Assignees: Georges Harik, Palo Alto, CA (US); PageBites, Inc., Palo Alto, CA (US)

( * ) Notice: Subject to any disclaimer, the term of this patent is extended or adjusted under 35 U.S.C. 154(b) by 303 days.

(21) Appl. No.: 14/157,327

(22) Filed: Jan. 16, 2014

(65) Prior Publication Data

US 2014/0250034 A1 Sep. 4, 2014

Related U.S. Application Data

(63) Continuation-in-part of application No. 13/921,124, filed on Jun. 18, 2013.

(60) Provisional application No. 61/661,736, filed on Jun. 19, 2012.

(51) Int. Cl.
*G06N 99/00* (2010.01)
*G06N 3/08* (2006.01)

(52) U.S. Cl.
CPC .............. *G06N 99/005* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 6,505,181 B1 * | 1/2003 | Lambert | G06N 3/088 706/20 |
| 2003/0195897 A1 | 10/2003 | Agrafiotis et al. | |
| 2005/0216426 A1 | 9/2005 | Weston et al. | |
| 2014/0006321 A1 | 1/2014 | Harik | |
| 2014/0156569 A1 | 6/2014 | Harik | |

OTHER PUBLICATIONS

Le et al, On Optimization Methods for Deep Learning, 2011.*
Vincent et al, Extracting and Composing Robust Features with Denoising Autoencoders, 2008.*
Vincent et al, Stacked Denoising Autoencoders: Learning Useful Representations in a Deep Network with Local Denoising Criteria, 2010.*
Domke, Justin "Automatic Differentiation and Neural Networks"; Sep. 1, 2011; Downloaded Mar. 19, 2015; http://users.cecs.anu.edu.au/~jdomke/courses/sml2011/08autodiff_nnets.pdf; 13 pages.

(Continued)

*Primary Examiner* — Stanley K Hill
*Assistant Examiner* — Mikayla Chubb
(74) *Attorney, Agent, or Firm* — Edward C. Kwok; Hogan Lovells US LLP

(57) ABSTRACT

An apparatus and a method are provided for learning a program with a large number of parameters. In one embodiment, a method not only distorts the input values, but also distorts some of the parameters in the program model. Such an approach not only forces the learned program to acquire parameter values to predict missing or desired data, but also to correct errors in the input data and the program parameters themselves, thereby rendering the learned program more resilient to overfitting and falling into local optima.

23 Claims, 1 Drawing Sheet

(56) References Cited

OTHER PUBLICATIONS

StatSoft Inc.; "Neural Networks"; 2002 [Online] Downloaded Apr. 14, 2014, http://www.obgyn.cam.ac.uklcam-only/statsbook/stneunet.html, 34 pages.

Grabner, Markus et al.; "Automatic Differentiation for GPU-Accelerated 2D/3D Registration"; Institute for Computer Graphics and Vision, Graz University of Technology, Graz, Austria; 2008 [Online] Downloaded Mar. 19, 2015; http://link.springer.com/chapter/10.1007/978-3-540-68942-3_23#, 11 pages.

* cited by examiner

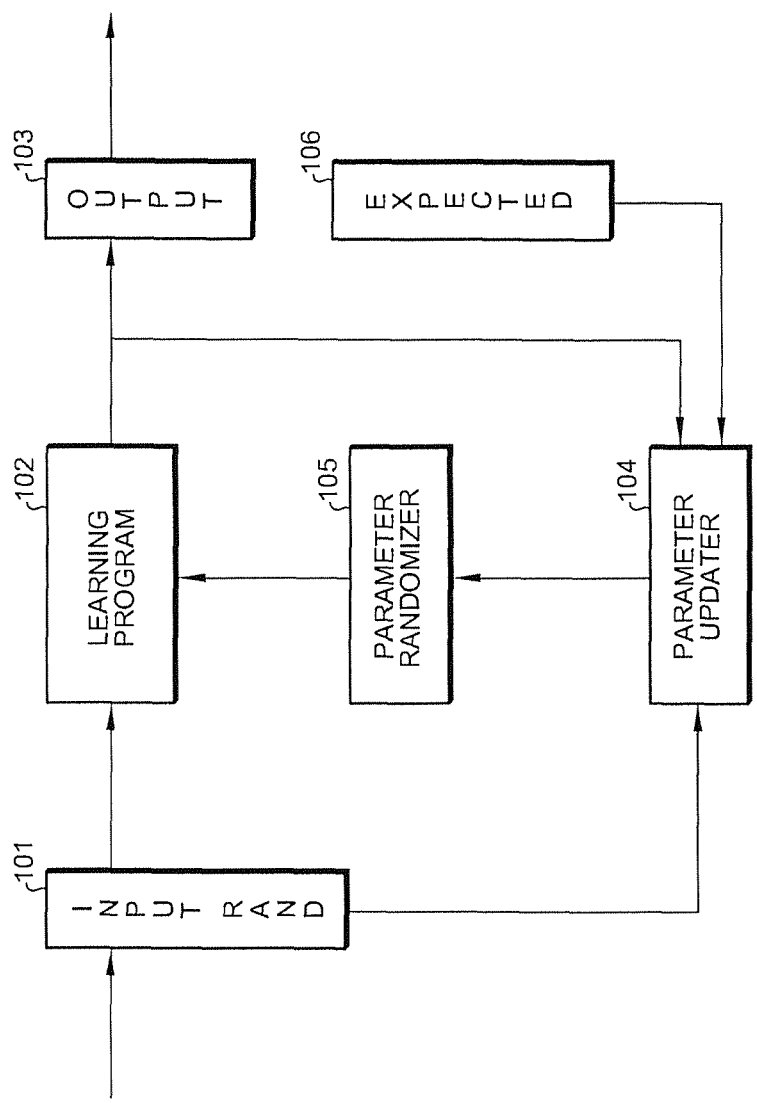

METHOD AND APPARATUS FOR IMPROVING RESILIENCE IN CUSTOMIZED PROGRAM LEARNING NETWORK COMPUTATIONAL ENVIRONMENTS

CROSS-REFERENCE TO RELATED APPLICATIONS

This application is a continuation-in-part application of copending U.S. patent application ("Copending Application"), Ser. No. 13/921,124, entitled "Method and Apparatus for Improving Resilience in Customized Program Learning Network Computational Environments," filed on Jun. 18, 2013 and U.S. provisional patent application ("Copending Application"), Ser. No. 61/661,736, entitled "Method for Improving Resilience in Customized Neural Network Computational Environments," filed on Jun. 19, 2012. The disclosures of the Copending Applications are hereby incorporated by reference in their entirety.

BACKGROUND OF THE INVENTION

1. Field of the Invention

The present invention relates to improving resilience in a computational environment that is based on programs that learn, such as a neural network model. In particular, the present invention relates to introducing noise into a learning program to improve resilience to overfitting data, and to avoid getting stuck in local optima.

2. Discussion of the Related Art

Learning programs, such as neural networks, have been used to uncover hidden information inherent in data. The uncovered hidden information allows that data to be subsequently analyzed for a variety of purposes, such as classification or for use in decision making. A neural network model is usually based on a graph consisting of nodes that are referred to as "neurons" and directed, weighted edges connecting the neurons. When implemented in a computational environment, the directed graph of the neural network model typically represents a function that is computed in the computational environment. In a typical implementation, each neuron is assigned a simple computational task (e.g., a linear transformation followed by a squashing function, such as a logistic function) and a loss function is computed over the entire neural network model. The parameters of the neural network model are typically determined ("learned") using a method that involves minimizing the loss function. A large number of techniques have been developed to minimize the loss function. One such method is "gradient descent," which is computed by finding analytical gradients for the loss functions and perturbing or moving the test values by a small amount in the direction of the gradient.

One specialized neural network model, called an autoencoder, has been gaining adherents recently. In the autoencoder, the function that is to be learned is the identity function, and the loss function is a reconstruction error computation on the input values themselves. One technique achieves effective learning of a hidden structure in the data by requiring the function to be learned with fewer intermediate neurons than the values in the input vector itself. The resulting neural network model may then be used in further data analysis. As an example, consider the data of a 100×100 pixel black-and-white image, which may be represented by 10000 input neurons. If the intermediate layer of the computation in a 3-layer network is constrained to having only 1000 neurons, the identity function is not trivially learnable. However, the resulting connections between the 10000 input neurons and the 1000 neuron in the hidden layer of the neural network model would represent in some extent the interesting structure in the data. Once the number of neurons in such an intermediate layer begins to approach 10000 then the trivial identity mapping becomes a more likely local optimum to be found by the training process. The trivial identity mapping, of course, would fail to discover any hidden structure of the data.

An interesting technique to allow a large number of intermediate neurons to be used is the "denoising autoencoder." In a denoising autoencoder, the input values are distorted, but the network is still evaluated based on its ability to reconstruct the original data. This makes the identity function not usually a good local optimum, and thereby allows a larger hidden layer (i.e., with more neurons) to be available to learn more relationships inherent in the data.

SUMMARY

The present invention provides an apparatus and a method which allow a learning program to use a large number of parameters without failing through overfitting or getting stuck in local optima. In one embodiment, a method not only distorts the input values, but also distorts some of the parameters in the program model, such as a neural network model. Such an approach not only forces the learned program to acquire parameter values that allow the program to predict missing or desired data in the input, but also to correct errors in the input data or the program parameters themselves.

The present invention is better understood upon consideration of the detailed description below.

BRIEF DESCRIPTION OF THE DRAWINGS

FIG. 1 is a block diagram of one implementation of program learning system 100, according to one embodiment of the present invention.

DETAILED DESCRIPTION OF THE PREFERRED EMBODIMENTS

The present invention provides a method which allows programs to be learned using a large number of parameters. A method of the present invention distorts both the input values and some of the parameters in the program model (e.g., a neural network model).

FIG. 1 is a block diagram of one implementation of program learning system 100, according to one embodiment of the present invention. As shown in FIG. 1, program learning system 100 includes input randomizer module 101, learning program 102, output port 103, parameter updater 104, parameter randomizer module 105 and expected output module 106. In one embodiment of the present invention, program learning system 100 may be implemented on a computational environment that includes a number of parallel processors. In one implementation, each processor may be a graphics processor, to take advantage of computational structures optimized for arithmetic typical in such processors. A host computer system using conventional programming techniques may configure program learning system 100 for each program to be learned. Learning program 102 may be organized, for example, as a neural network model. The program model implemented in learning program 102 may be variable, taking into account, for example, the structure and values of the input vector and the structure and values of the expected output data. Control flow in the program model may be constructed based on the input vector or intermediate values ("states values") computed in the program model.

A method of the present invention is described in conjunction with the operation of program learning system 100. Under this method, the following operations are carried out for each individual input in program learning system 100:

a. selecting a random input distortion percentage (with a maximum of, say, 50%) and a random parameter distortion percentage, which need not equal the input distortion percentage;

b. alternatively to (a), letting the distortion percentage decay according to some schedule, so as to continuously expose the program to less distortion after it has learned simple patterns. One useful schedule is $(c1*c2)/(c1+c3*t)$ where the different c1, c2, and c3 constants are suitably chosen constants and t is the number of optimization steps (or the number of examples in the training data) that have been explored so far. This allows a certain fixed amount of time to individually learn new features;

c. blanking out or randomizing ("corrupt") a portion of the input vector that is received into input randomizer 101 based on the input distortion percentage selected;

d. blanking out or randomizing ("corrupt") a portion of the parameters in the parameter randomizer module 105 using the parameter distortion percentage and providing the corrupted parameters to the program model configured in learning program 102;

e. providing an output vector to output port 103 from learning program 102, using the distorted input vector in the distorted program model; and f. Based on the expected output data provided by expected output module 106 and the output vector, applying in parameter updater 104 a suitable learning technique, such as a gradient descent technique, to update the parameters in the program model.

The method iterates repeatedly (and sometimes stochastically) over all the available input vectors. The collection of all input vectors is referred to as the "input set". In this context, blanking or randomizing refers to assigning a value that is recognized by the system to represent a missing datum, a value based on a random distribution, or a zero value. The expected output data in expected output module 106 may be generated by a training algorithm, or provided a priori. Under this method, the program model learns to construct the expected output data using only a varying fraction of its parameter values. As a result, the program model must adapt to be less reliant on any one parameter and to develop error-correcting parameters. As a result, the learned program can be used to predict missing input data and to correct errors in the input data, as well as to predict desired data related to the input data (e.g., a classification). The learned program will also exhibit resilience in accommodating greater variations in input data and state values.

The selection of the level of corruption also plays an interesting part in avoiding overfitting of the data. While the program model learns simple cases at low levels of distortion, leaving in variable amounts of distortion in the network connections allow the program to learn more challenging cases, especially after the simple cases have been learned. In that way, the gradient of the program in the learning network is always driven in the direction of having to solve ever more complicated cases, and empirically this tendency seems to reduce the amount the program model overfits the data. As the program model functions at greater corruption, the learned program incorporates to greater extent the inherent structure of the data, and the predicted values required.

Alternatively the program model can be initialized with a high level of corruption in the parameters or input variables, causing it not to overfit by overlearning from the initially seen combinations. This level of corruption can be then relaxed as learning progresses according to a schedule. One implementation that has been shown to be useful is to let the distortion percentage decay according to a schedule designed to continuously expose the program model to successively lessen distortion after it has learned simple patterns. In that regard, one schedule may be $(c1*c2)/(c1+c3*t)$ where c1, c2, and c3 are suitably chosen constants and t is the number of optimization steps (or the number of examples in the training data) that have been explored so far. This schedule allows a certain fixed amount of time to individually learn new features.

According to one embodiment of the present invention, a language model was trained using phrases randomly extracted from a number of Wikipedia documents to predict a next word from one or more words in an input vector (e.g., a phrase or sentence completion application). The language model was able to learn underlying structures in common phrases. For example, the word "City" is predicted to likely follow the two-word sequence "New" and "York." In another embodiment, a search model was trained to predict from an input phrase the documents in a document collection that the input phrase is likely to have originated from. The language model and the search model may be linked to build a search engine. Many applications may be found in predicting various interactions in a social media network.

The methods provided in this detailed description may be implemented in a distributed computational environment in which one or more computing elements (e.g., neurons) are implemented by a physical computational resource (e.g., an arithmetic or logic unit). Implementing program learning system 100 in parallel graphics processors is one example of such an implementation. Alternatively, the methods may be implemented in a computational environment which represents each parameter in a customized data structure in memory, and a single processing unit processes program element in any suitable order. The methods of the present invention can also be implemented in a computational environment that is in between the previous two approaches.

The above detailed description is provided to illustrate the specific embodiments of the present invention and is not intended to be limiting. Various modification and variations within the scope of the present invention are possible. The present invention is set forth in the following claims.

I claim:

1. In a computational environment, a method for learning a program that is characterized by a number of parameters, the computing environment allowing the program to receive an input vector, an expected output vector and values of the parameters, the method comprising of:

choosing an input vector or parameter distortion schedule that decreases over time an input distortion percentage or a parameter distortion percentage during the optimization; and in accord with the input vector or parameter distortion schedule, perform:

blanking out or randomizing the input distortion percentage of values in the input vector;

blanking out or randomizing the parameter distortion percentage of the values of the parameters of the program; and applying a learning technique to the program, using the expected output vector, the distorted input vector and distorted parameters.

2. The method of claim 1, wherein the input vector or parameter distortion schedule comprising decaying the input distortion percentage or the parameter distortion percentage over time using a factor given by $(c1*c2)/(c1+c3*t)$, where c1, c2 and c3 are selected constants and t represents a number of optimization steps or groups of training data already explored.

3. The method of claim 1, wherein the expected output vector is generated by a training algorithm.

4. The method of claim 1 wherein, in which the blanking out or randomizing steps, the input values or parameter values are randomized based on one or more predetermined random distributions.

5. The method of claim 1, wherein the learning technique applied comprises the step of minimizing a loss function computed over a sample of the input.

6. The method of claim 4, wherein the step of minimizing the loss function is carried out using gradient descent, or second order minimization methods such as newton or quasi-newton methods over the loss function.

7. The method of claim 1 wherein the program uses a control flow determined by a structure or value of the input vector or the state values in the program.

8. The method of claim 7, wherein the program comprises linear transformations among values in the input vector, values of the parameters, and state values of the program.

9. The method of claim 7, wherein the program uses one or more nonlinear functions among values in the input vector, values of parameters, and state values of the program.

10. The method of claim 7, wherein the nonlinear functions include a sigmoid function and a rectified linear function.

11. The method of claim 1, wherein the computational environment includes a plurality of computational resources each assigned to process a fraction of the input set.

12. An apparatus for learning a program that is characterized by a number of parameters, the apparatus receiving an input vector, an expected output vector, and values of the parameters, the apparatus comprising:
   one or more processors configured to provide: (a) an input randomizing module; (b) a parameter randomizing module; (c) a parameter updater; and (d) an expected output module, wherein the apparatus carries out a method comprising:
      choosing an input vector or parameter distortion schedule that decreases over time an input distortion percentage or a parameter distortion percentage during the optimization; and in accord with the input vector or parameter distortion schedule, perform:
         blanking out or randomizing the input distortion percentage of values in the input vector;
         blanking out or randomizing the parameter distortion percentage of the values of the parameters of the program; and
         applying a learning technique to the program, using the expected output vector, the distorted input vector and distorted parameters.

13. The apparatus of claim 12, wherein the input vector or parameter distortion schedule comprising decay the input distortion percentage or the parameter distortion percentage over time using a factor given by $(c1*c2)/(c1+c3*t)$, where c1, c2 and c3 are selected constants and t represents a number of optimization steps or groups of training data already explored.

14. The apparatus of claim 12, wherein the expected output vector is generated by a training algorithm.

15. The apparatus of claim 12 wherein, in the blanking out or randomizing steps, the input values or parameter values are randomized based on one or more predetermined random distributions.

16. The apparatus of claim 12, wherein the learning technique applied comprises the step of minimizing a loss function computed over a sample of the input.

17. The apparatus of claim 16, wherein the step of minimizing the loss function is carried out using gradient descent over the loss function.

18. The apparatus of claim 12 wherein the program uses a control flow determined by a structure or value of the input vector or the state values in the program.

19. The apparatus of claim 18, wherein the program comprises linear transformations among values in the input vector, values of the parameters, and state values of the program.

20. The apparatus of claim 18, wherein the program uses one or more nonlinear functions among values in the input vector, values of parameters, and state values of the program.

21. The apparatus of claim 18, wherein the nonlinear functions include a sigmoid function and a rectified linear function.

22. The apparatus of claim 12, wherein the computational environment includes a plurality of computational resources each assigned to process a fraction of the input set.

23. The apparatus of claim 22, wherein the computational resources comprise graphics processors.

* * * * *